United States Patent
Eriksson

[11] Patent Number: 5,993,304
[45] Date of Patent: Nov. 30, 1999

[54] HAND-HELD APPARATUS FOR SIDEWAYS DRIVING OF A TOOL

[75] Inventor: Rolf Eriksson, Hägersten, Sweden

[73] Assignee: AB Dentatus, Hagersten, Sweden

[21] Appl. No.: 09/051,587
[22] PCT Filed: Oct. 18, 1996
[86] PCT No.: PCT/SE96/01331
  § 371 Date: Apr. 15, 1998
  § 102(e) Date: Apr. 15, 1998
[87] PCT Pub. No.: WO97/14531
  PCT Pub. Date: Apr. 24, 1997

[30] Foreign Application Priority Data

Oct. 18, 1995 [SE] Sweden .................. 9503644

[51] Int. Cl.$^6$ .................................................. B24B 23/04
[52] U.S. Cl. ............................................ 451/356; 451/357
[58] Field of Search ................................. 451/351, 356, 451/357

[56] References Cited

U.S. PATENT DOCUMENTS

| | | |
|---|---|---|
| 2,350,098 | 5/1944 | Decker . |
| 3,418,761 | 12/1968 | Sheps . |
| 4,128,970 | 12/1978 | Sawrenko ................. 451/356 |
| 4,686,797 | 8/1987 | Hoffman . |
| 5,212,995 | 5/1993 | Robinson et al. ............ 451/356 X |
| 5,239,978 | 8/1993 | Plangetis ................. 451/356 X |
| 5,437,571 | 8/1995 | Everts et al. . |
| 5,759,093 | 6/1998 | Rodriguez ................. 451/356 |

FOREIGN PATENT DOCUMENTS 0 372 376  6/1990  European Pat. Off. .

Primary Examiner—Timothy V. Eley
Attorney, Agent, or Firm—Young & Thompson

[57] ABSTRACT

A hand tool includes an apparatus housing (2), a drive shaft part (10) which is rotatable in the housing, and toolholder part (18) which is mounted pivotably in the housing, is operatively connected to the drive shaft part and has a securing portion (24) projecting from the housing for the purpose of receiving a file, for example. A shaft journal (30) is secured in the drive shaft part (10) and is eccentrically positioned (R) in relation to the center line (A) of the drive shaft part. The shaft journal (30) supports, on its section (48) outside the drive shaft part, a movement-transmitting member (50') with an outer limit surface (52'). This member is arranged in drive engagement with a recess (54) in the end portion of the toolholder part (18) located inside the apparatus housing (2). In the recess (54) the movement-transmitting member (50') can move transverse to the toolholder part (18), with the outside (52') rolling against adjoining contact surfaces (56, 58) which delimit the recess. The circular eccentric movement of the shaft journal (30) about the center axis (A) of the drive shaft part (10) imparts to the toolholder part (18), mounted pivotably in the housing (2), a sideways pendulum movement when the drive shaft part is rotating.

8 Claims, 2 Drawing Sheets

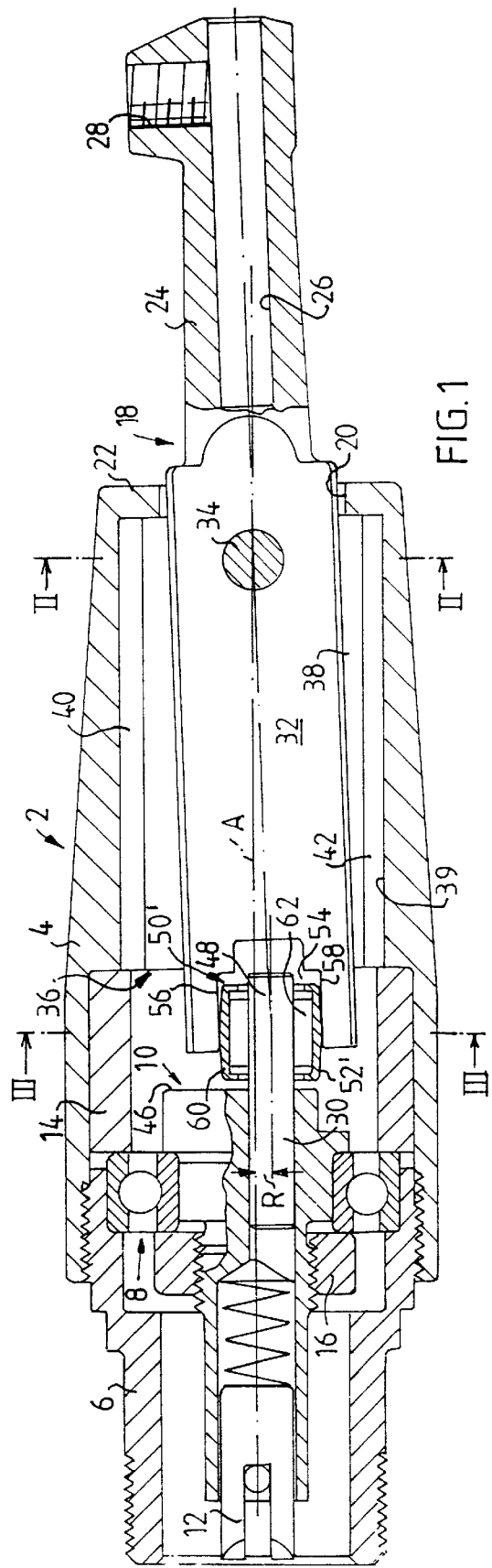

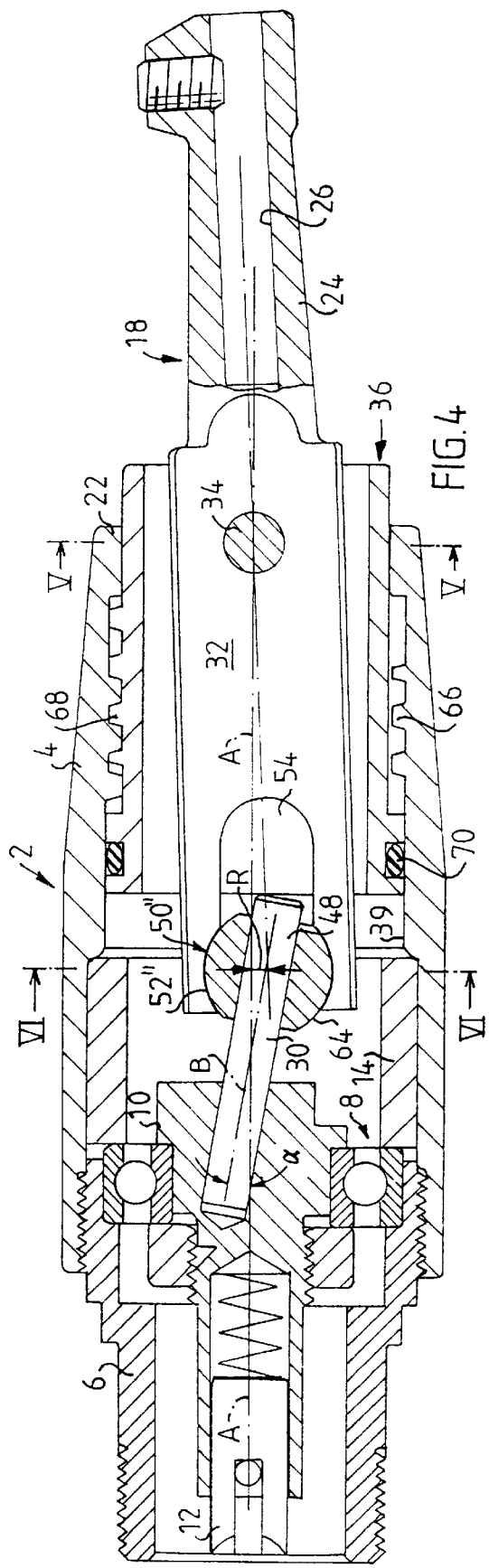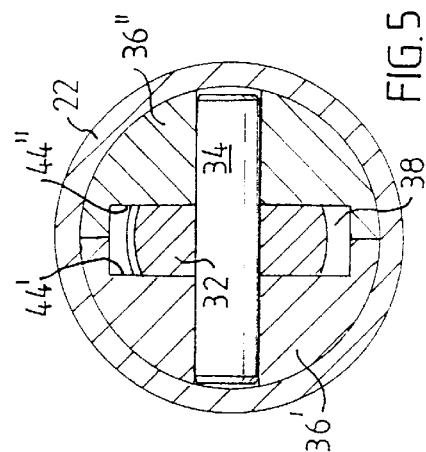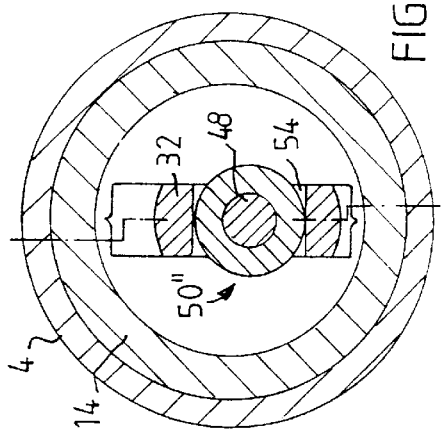

HAND-HELD APPARATUS FOR SIDEWAYS DRIVING OF A TOOL

The present invention relates to a hand tool which is designed for motorized operation and which is of the type specified for motorized operation and which is of the type specified in the precharacterizing clause of Patent Claim 1.

Such a hand tool comprises, in very general terms, an apparatus housing, a drive shaft part which is mounted rotatably in the apparatus housing and is designed to be driven by some suitable type of motor, a toolholder part which is mounted pivotably in the apparatus housing, is operatively connected to the drive shaft part and has a securing portion projecting from the apparatus housing for a machining tool, for example a file. One end of a shaft journal is secured in the drive shaft part, the said shaft journal being eccentrically positioned in relation to the geometric axis of rotation or centre line of the drive shaft part.

PRIOR ART

Hand tools of a similar type are already known from, for example, Swedish Patent Application 9301273-0, U.S. Pat. No. 2,824,455 and U.S. Pat. No. 4,114,270.

The hand tool which is described in the said Swedish patent application has a securing member for a machining tool, preferably a file. This securing member is driven in such a way that it executes a reciprocating working movement in its longitudinal direction, as a result of which the tool secured in the member is caused to execute a reciprocating machining movement in its longitudinal direction.

A hand tool of this known type is especially suitable for precision machining of workpiece surfaces in the area of edges, corners, grooves or, mainly, at places where different surfaces of the workpiece join one another at an angle, as a result of which the machining space is limited and/or difficult to get at.

However, this known techniques always involves a machining direction which is essentially in line with the longitudinal direction of the hand tool (apparatus) in question. With this known type of hand tool, however, it is not possible to machine material in the transverse direction of the toolholder part without in this case moving the whole hand tool (apparatus) to and fro in a sideways direction.

Furthermore U.S. Pat. No. 5,437,571 discloses an oscillating tool in accordance with the preamble of claim 1.

OBJECTS OF THE INVENTION

An object of the present invention is to make available a novel type of hand tool which is driven by means of a suitable motor and with which it is possible to machine material in a direction transverse to the toolholder part and, consequently, transverse to the machining tool which is held by the toolholder part, and which tool can be, for example, a file suitable for precision machining.

Such reciprocating sideways or lateral movement of the tool is required especially for polishing, fine grinding, precision machining, and other types of finish-machining, of surface areas to which access is difficult, such as in corners, at concave edges, in slots and in recesses.

A further object is to make available a hand tool which works with a sideways pendulum movement and whose apparatus housing can have small external transverse dimensions, so that the tool or the apparatus is compact and therefore easy to handle in confined spaces.

Another object of the invention is to make available a hand tool which works with a sideways pendulum movement and whose working stroke in the transverse direction of the machining tool (for example the file) is adjustable, or in other words a hand-held apparatus whose stroke length (sideways pendulum movement can be adjusted.

DISCLOSURE OF THE INVENTION

According to the invention, the abovementioned objects are achieved by virtue of the fact that the hand tool of the type mentioned in the introduction has the features specified in the characterizing clause of Patent Claim 1.

Further constructional features, which represent further developments of the invention according to claim 1, are evident from the dependent claims.

What is novel, and what distinguishes the hand tool according to the invention, is that the shaft journal secured in the drive shaft part has a shaft journal section which projects from the drive shaft part and which supports a movement-transmitting member with an annular, outer limit surface. This movement-transmitting member is arranged in drive engagement with a recess in the end portion of the toolholder part located inside the apparatus housing. In this recess, the movement-transmitting member can move transverse to the toolholder part, with the outer limit surface rolling against a pair of contact surfaces which delimit the recess. The circling eccentric movement of the eccentrically positioned shaft journal about the axis of rotation of the drive shaft part is generated by the rotation of the drive shaft part and serves to impart to the toolholder part, mounted pivotably in the apparatus housing, a sideways pendulum movement in a longitudinal plane in the apparatus housing.

The movement-transmitting member can be a roll-type bearing, for example a roller bearing or needle bearing, with an outer bearing sleeve, the outside of which then forms the outer limit surface of the member. Alternatively, the movement-transmitting member can be a ball-shaped carrier part which is mounted in a rotatable and axially displaceable manner on the projecting shaft journal section and whose spherically curved outer side then forms the outer limit surface of the member.

When the movement-transmitting member is a roll-type bearing, its roll bodies (for example rollers of needles) are arranged between the shaft journal section and the outer bearing sleeve, directing resting against the surface of the shaft journal section and the inside of the bearing sleeve, respectively.

The bearing sleeve preferably has a convex curvature in both the circumferential direction and the axial direction.

Constructionally, it is possible for the toolholder part to consist, in its area located inside the apparatus housing, of an elongate, plate-shaped pendulum portion which is pivotably mounted on a transverse bearing journal in the apparatus housing. This bearing journal is then inserted in a guide body which is arranged in the front part of the apparatus housing and in which there is a longitudinal guide chamber in which the pendulum portion is guided in a pivoting movement.

The guide body can in this case expediently consist of two essentially semi-cylindrical guide body parts which are arranged alongside each other, bear against each other, and are mounted in a cylindrical cavity in a front part of the apparatus housing. The guide body parts then have wall surfaces facing each other which are located at a distance from each other and form side walls of the guide chamber for the pendulum portion.

A hand tool which adjustable stroke length (i.e. adjustable sideways pendulum swing) can be obtained by means of the shaft journal secured in the drive shaft part being arranged at an acute angle to the axis of rotation of the drive shaft part, the guide body being arranged such that it is axially adjustable in the cylindrical cavity in the front part of the apparatus housing, for example by being screwably received therein. An axial adjustment (screwing) of the guide body in the said cavity then results in a displacement of the ball-shaped carrier part on the inclined shaft journal section, so that the carrier part is formed in towards the geometric axis of rotation of the drive shaft part or is forced outwards therefrom. This forced displacement of the ball-shaped carrier part produces the desired change in the stroke length.

BRIEF DESCRIPTION OF THE FIGURES IN THE DRAWINGS

The invention will now be described and explained in more detail hereinbelow with reference to several illustrative embodiments, shown in the drawings, of a hand tool according to the present invention, In the drawings:

FIG. 1 shows a longitudinal section through a first embodiment of a hand tool according to the invention;

FIG. 2 shows a cross-section along the line II—II in FIG. 1;

FIG. 3 shows a cross-section along the line III—III in FIG. 1;

FIG. 4 shows a longitudinal section through a second embodiment of a hand tool according to the invention;

FIG. 5 shows a cross-section along the line V—V in FIG. 4; and, finally,

FIG. 6 shows a cross-section along the line VI—VI in FIG. 4.

DESCRIPTION OF ILLUSTRATIVE EMBODIMENTS

FIG. 1 shows a longitudinal section through the front part of a hand-held grinding machine desired for motorized operation. The illustrated front part of the hand-held grinding machine is referred to as the hand tool in the present description. In addition to the illustrated front machine part, the complete grinding machine also includes a rear machine part which is connected to the said front machine part and which accommodates the drive motor, which may preferably be an electric motor. The machine could alternatively be driven by means of a hydraulic motor or a pneumatic motor. The machine's rear part (not shown here) receiving the motor is intended to be screwed, or connected in some other way, to the hand tool shown here, i.e. the front machine part.

The illustrated hand tool comprises an apparatus housing 2 consisting of a front apparatus housing part 4 and of a rear apparatus housing part 6 which is screwed into the rear end of the front apparatus housing part 4 (the left-hand end in FIG. 1) and which represents the housing part that can be connected in turn at the rear to the grinding machine part (not shown here) accommodating the motor. As can be seen from FIG. 2 and FIG. 3, the apparatus housing 2 is designed as a tubular casing.

A drive shaft part 10 is mounted rotatably in the apparatus housing 2 by means of a ball bearing 8, and its left-hand end in the Figure can be connected via a coupling part 12 to the drive motor shaft (not shown here) of the grinding machine. The ball bearing 8 is clamped between, on the one hand, a spacing sleeve 14 inserted in the front apparatus housing part 4, and, on the other hand, the front portion of the rear apparatus housing part 6 which has been screwed into the apparatus housing part 4. The drive shaft part 10 is screwed tight to the inner ring of the ball bearing 8 by means of a nut 16. Also mounted in the front apparatus housing part 4, in a pivotable manner, is a toolholder part 18 which at its rear end is operatively connected to the drive shaft part 10. The toolholder part has a securing portion 24 which projects via an opening 20 in the front end wall 22 of the apparatus housing part 4 and which has an axial bore 26 in which the securing end of a machining tool, such as a file, can be fixed by means of a locking screw (not shown here) which is screwed into the internally threaded bore 28 in the front part of the securing portion 24.

One end of a shaft journal 30 is secured in the drive shaft part 10, the said shaft journal 30 being eccentrically positioned, as can be seen, in relation to the axis of rotation or geometric axis A of the drive shaft part.

In its area located inside the front apparatus housing part 4 of the apparatus housing 2, the toolholder part 18 consists of an elongate, plate-shaped pendulum portion 12 which is pivotably mounted on a transverse bearing journal 34 in the apparatus housing. As can be seen from FIG. 2, this bearing journal 34 is inserted in a guide body 36 which is arranged in the front apparatus housing part 4 and which has a longitudinal guide chamber 38 in which the pendulum portion 32 is guided such that it can execute a pivoting movement. The guide body 36 is mounted in a cylindrical cavity 39 in the front apparatus housing part 4 and is there axially fixed between the front end wall 22 of the apparatus housing and the annular front end wall of the spacing sleeve 14. The guide body 36 consists of two essentially semi-cylindrical guide body parts 36' and 36" which are arranged alongside each other, bear against each other, and are thus mounted in the cylindrical cavity 39. The guide body parts 36' and 36" are in contact with each other at contact surface areas 40 and 42. The guide body parts 36' and 36" have wall surfaces 44' and 44" facing each other which are located at a distance from each other slightly exceeding the thickness of the pendulum portion 32, and which form side walls of the guide chamber 38.

We now move on to describe the constructional design of the drive connection between the drive shaft part 10 and the plate-shaped pendulum portion 32 of the toolholder part 18.

As can be seen from FIG. 1, the shaft journal 30 has a shaft journal section 48 which projects outside the front surface 46 of the drive shaft part 10 and which supports a movement-transmitting member 50' having an annular outer limit surface 52'. This movement-transmitting member 50' is arranged in operative engagement with a recess 54 in the end portion of the plate-shaped pendulum portion 32 of the toolholder part 18. Upon rotation of the drive shaft part 10, and consequently upon the circular orbiting movement of the shaft journal 30 about the geometric axis A, the movement-transmitting member 50' is movable in the recess 54 in the direction transverse to the plane of the plate of the pendulum portion 32, i.e. parallel to the axle direction of the bearing journal 34. The reciprocating transverse movement of the movement-transmitting member 50' in the recess 54—at right angles to the drawing plane in FIG. 1—takes place with the outer limit surface 52' of the member rolling against an upper contact surface 56 and a lower contact surface 58 which constitute the limit surface of the recess 54. The upward and downward pendulum movement of the movement-transmitting member 50', as sen in the drawing plane in FIG. 1, is the "useful", active component of the circular orbiting movement of the shaft journal 30, which component is taken up and transferred to the pendulum portion 32 and results in the desired pendulum movement of the latter about the bearing journal 34.

The orbiting eccentric movement of the shaft journal 30 about the geometric axis of rotation A, which movement is generated by the rotation of the drive shaft part 10, thus serves to impart to the toolholder part 18, mounted pivotably in the apparatus housing 2, a sideways pendulum movement (upwards and downwards in FIG. 1) in a longitudinal plane in the apparatus housing 2. This pendulum movement thus takes place in a plane at right angles to the bearing journal 34, which plane corresponds to FIG. 1 to the drawing plane. By means of the tool-holder part 18 thus being set is a reciprocating pendulum movement, the machining tool, for example a file, secured in the bore 26 of the toolholder part 18 is brought into a reciprocating, swinging sideways work movement.

In the embodiment of the hand tool according to the invention as illustrated in FIGS. 1–3, the movement-transmitting member 50' consists of a roll-type bearing with an outer bearing sleeve 60 whose outside then constitutes the outer limit surface 52' of the member. The roll bodies 62 of the roll bearing 50' are arranged between the surface of the shaft journal section 48 and the inside of the bearing sleeve 60. The annular bearing sleeve 60 is designed so that its outside 52' has a convex curvature in the axial direction of the sleeve, as is shown in FIG. 1. In this way, the change in angle between the outside of the bearing sleeve 60 and the contact surfaces 56 and 58 of the recess 54 can take place without play occurring.

Reference, is now made to the second embodiment of a hand tool according to the invention as illustrated in FIGS. 4–6. This second embodiment differs in principle from that illustrated in FIGS. 1–3 chiefly in that it permits readjustment or modification of the stroke length of the toolholder part 18, i.e. its maximum pendulum swing about the bearing journal 34. Apart from the constructional features which are required in order to permit an adjustable stroke length, the hand tool according to FIGS. 4–6 is in principle constructed in the same way as the hand tool illustrated in FIGS. 1–3. Those parts of the embodiment according to FIGS. 4–6 which correspond directly to the embodiment according to FIGS. 1–3 are therefore provided with the same reference labels as in FIGS. 1–3, and their construction and the way in which they function in relation to one another will not be repeated in conjunction with the description of the embodiment according to FIGS. 4–6.

The particular distinguishing feature of the embodiment according to FIGS. 4–6 is that the shaft journal 30 secured in the drive shaft part 10 is in this case mounted in an inclined manner in the drive shaft part 10 so that the journal forms an acute angle α to the axis of rotation A of the drive shaft part 10. Another particular distinguishing feature of the embodiment according to FIGS. 4–6 is that the movement-transmitting member 50" is in this case designed as a ball-shaper carrier part which is mounted in a rotatable and axially displaceable manner on the projecting shaft journal section 48 and whose spherically curved outside 64 forms the outer limit surface 52" of the movement-transmitting member.

To obtain an adjustable stroke length for the toolholder part 18, the guide body 36 is in this case arranged in an axially adjustable manner in the cylindrical cavity 39 in the front apparatus housing part 4. The adjustability is in this case achieved by means of a form of thread connection in the contact area between the outside of the guide body 36 and the inner wall of the cavity 39. This thread connection includes, for example, as is shown in FIG. 4, internal threads 66 on the inner wall of the cavity 39 and, cooperating with these, external threads 68 on the outside of the guide body 36. In this case there is also an annular seal 70 between the guide body 36 and the adjacent wall surface of the cavity 39, which seal 70 affords a suitable friction resistance against undesired screwing movement between the guide body 36 and the apparatus housing part 4.

When the stroke length of the toolholder part 18 is desired to be changed, then the guide body 36 is quite simply screwed either some distance axially inwards in the apparatus housing 2 or an axial distance outwards, the result of which is that the movement-transmitting member 50" designed as a ball-shaped carrier part is displaced some distance inwards (to the left in FIG. 4) on the shaft journal 30 or some distance outwards thereon, which means that the radial distance R, determining the stroke length, between the geometric axis of rotation A and the longitudinal axis B of the shaft journal 30 is changed to a corresponding extent. In the embodiment according to FIGS. 1–3, this radial distance R is of course unchangeable.

I claim:

1. Hand tool comprising an apparatus housing (2), a drive shaft part (10) rotatably mounted in the apparatus housing, a toolholder part (18), being pivotably mounted on a transverse bearing journal (34) in the apparatus housing, is operatively connected to the drive shaft part (10) via a shaft journal (30) and has a tool securing portion (24) projecting from the apparatus housing (2), the shaft journal (30), having a first end thereof secured in the drive shaft part (10), is eccentrically positioned in relation to the axis (A) of rotation of the drive shaft part, the shaft journal (30) having at a second end thereof a journal section (48) projecting from the drive shaft part (10) and extending into a recess (54) at an end of the toolholder part (18) inside the apparatus housing (2), characterized in that the shaft journal section (48) rotatably supports a movement-transmitting member (50',50") having an annular, outer limit surface (52', 52") and being arranged in movable drive engagement with the recess (54) with the outer limit surface rolling against a pair of contact surfaces (56,58) delimiting the recess (54), and that the bearing journal (34) is inserted in a guide body (36) having a longitudinal chamber (38) in which a plate-shaped pendulum portion (32) of the toolholder part (18) is guided for pivotal movement, the guide body (36) being arranged in a forward part (4) of the apparatus housing and consisting of two essentially semi-cylindrical guide body parts (36',36") and in that circling eccentric movement of the shaft journal (30) about said axis (a) of rotation imparts to the pendulum portion (32) of the toolholder part (18) a pendulum movement in the longitudinal chamber (38) of the guide body (36).

2. Hand tool according to claim 1, characterized in that the movement-transmitting member (50') is a roll-type bearing having an outer bearing sleeve (60) the outside of which form the outer limit surface (52') of the member.

3. Hand tool according to claim 2, characterized in that roll bodies (62) of the roll-type bearing (50') are arranged between the shaft journal section (48) and the outer bearing sleeve (60), directly resting against a surface of the shaft journal section and the inside of the bearing sleeve (60).

4. Hand tool according to claim 3, characterized in that the outside of the bearing sleeve (60) has a convex curvature in both a circumferential cross-section and an axial cross-section.

5. Hand tool according to claim 1, characterized in that the movement-transmitting member (50") is a ball-shaped carrier part which is mounted in a rotatable and axially displaceable manner on the projecting shaft journal section (48) and whose spherically curved outside (64) forms the outer limit surface (52") of the member.

6. Hand tool according to claim 5, characterized in that the shaft journal (30) secured in the drive shaft part (10) forms an acute angle ($\alpha$) to said axis of rotation (A) of the drive shaft part, and in that the guide body (36) is arranged in an axially adjustable manner in the cylindrical cavity (39) in the forward part (4) of the apparatus housing (2).

7. Hand tool according to claim 6, characterized in that the guide body (36) has an external wall area which is provided with thread portions (68) and which is in screw engagement with a corresponding area of the wall of the cavity (39) provided with threads (66), the screwing of the guide body (36) in the apparatus housing (2) resulting in a change in a stroke length of the toolholder part (18).

8. Hand tool according to claim 1, characterized in that the guide body parts (36',36") are arranged alongside each other in a cylindrical cavity (39) in the forward part (4) of the apparatus housing and have contact surface areas (40,42) bearing against each other, and the guide body parts (36', 36") have wall surfaces (44', 44") facing each other which are located at a distance from each other and form side walls of the guide chamber (38) for the pendulum portion (32).

* * * * *